(12) United States Patent
White et al.

(10) Patent No.: US 9,120,132 B2
(45) Date of Patent: Sep. 1, 2015

(54) PALLET WASHING APPARATUS

(75) Inventors: Larry White, Atlanta, GA (US);
Thomas J. Jordan, Evans, GA (US)

(73) Assignee: ZZ VENTURES, LLC, Atlanta, GA (US)

(*) Notice: Subject to any disclaimer, the term of this patent is extended or adjusted under 35 U.S.C. 154(b) by 801 days.

(21) Appl. No.: 13/453,358

(22) Filed: Apr. 23, 2012

(65) Prior Publication Data
US 2013/0112229 A1 May 9, 2013

Related U.S. Application Data

(60) Provisional application No. 61/557,551, filed on Nov. 9, 2011.

(51) Int. Cl.
| | | |
|---|---|---|
| *B08B 3/00* | (2006.01) | |
| *B08B 3/02* | (2006.01) | |
| *F26B 3/08* | (2006.01) | |
| *F26B 3/092* | (2006.01) | |
| *B08B 13/00* | (2006.01) | |

(52) U.S. Cl.
CPC . *B08B 3/022* (2013.01); *F26B 3/08* (2013.01); *F26B 3/0923* (2013.01); *B08B 13/00* (2013.01)

(58) Field of Classification Search
USPC ......... 134/62, 66, 140, 76, 133, 131, 198, 34, 134/56 R, 42, 59, 61; 108/57.25, 901, 51.11, 108/55.1, 55.3, 57.26, 57.17, 57.31, 57.33, 108/53.1; 206/386, 503, 509, 499, 821, 206/508; 198/346.1, 345.3, 465.1, 435, 198/465.2, 346.2; 269/309, 20, 900, 289 R, 269/56
See application file for complete search history.

(56) References Cited

U.S. PATENT DOCUMENTS

2011/0203622 A1* 8/2011 Buck et al. ............ 134/198

* cited by examiner

*Primary Examiner* — Michael Barr
*Assistant Examiner* — Thomas Bucci
(74) *Attorney, Agent, or Firm* — Thomas C. Saitta

(57) ABSTRACT

A pallet washing apparatus and its associated methodology, wherein all of the pallets in a vertical stack of pallets are cleaned simultaneously, the stack being vertically expanded to provide a separation distance between each pallet, with each pallet then being delivered onto individual conveyors passing through washing, rinsing and drying stations, such that cleaning spray may be directed against all surfaces of each pallet, all of the pallets then being restacked for removal in a single stack.

20 Claims, 10 Drawing Sheets

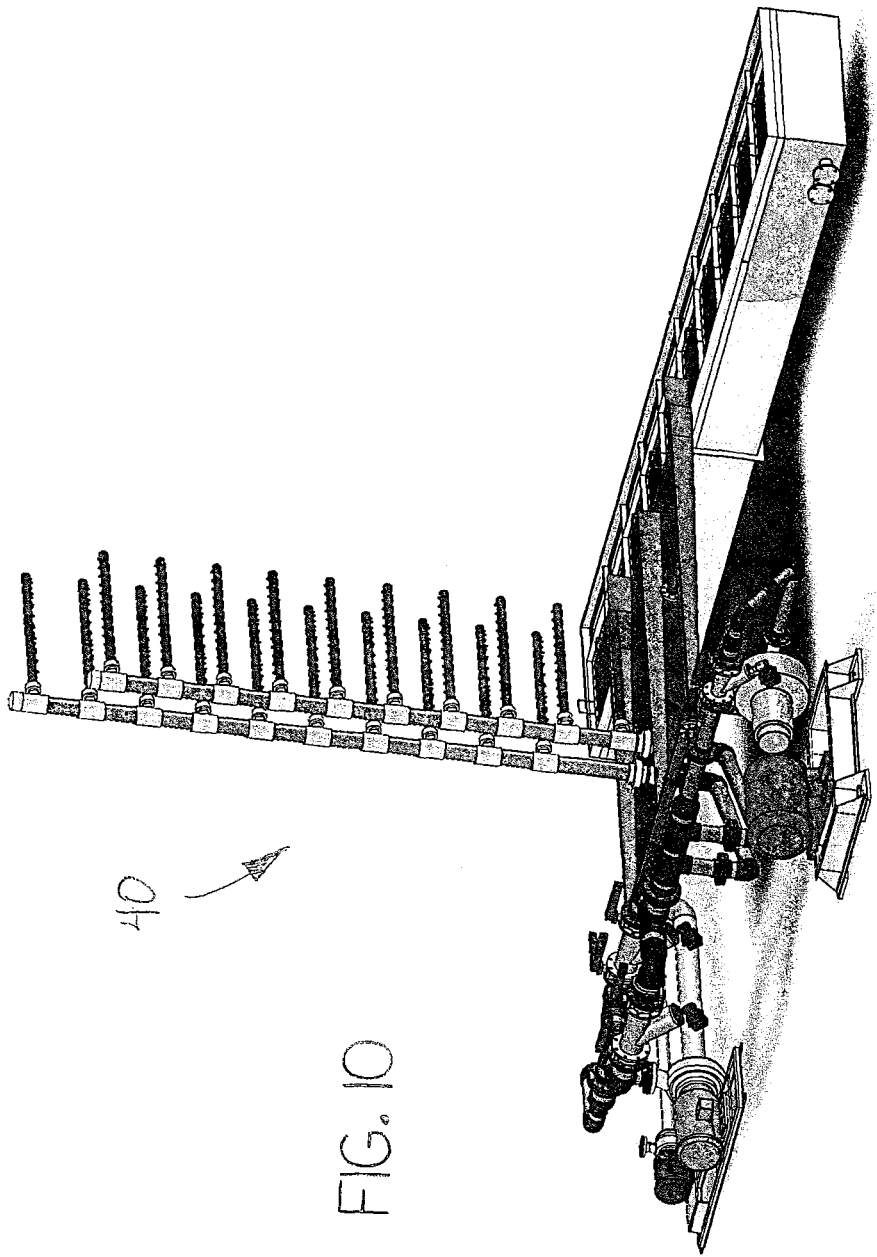

PALLET WASHING APPARATUS

This application claims the benefit of U.S. Provisional Patent Application Ser. No. 61/517,551, filed Apr. 21, 2011, the disclosure of which is incorporated herein by reference.

BACKGROUND OF THE INVENTION

This invention relates generally to the field of pallet or crate cleaning, and more particularly to equipment, apparatus, systems or the like wherein stacks of pallets are presented to the cleaning apparatus, the pallets are cleaned, and the cleaned pallets are then restacked. Even more particularly, the invention relates to such apparatuses wherein the handling and cleaning operations are mechanized.

Vast numbers of pallets are in use in multiple industries. The pallets are usually designed so as to be stackable or nestable for ease of transport and storage when the pallets are not loaded with goods. In many instances, the pallets become contaminated or dirty and must be cleaned prior to reuse. The dirty pallets are preferably transported and stored in vertical stacks, since the stacks are readily movable utilizing forklifts or similar devices. The common techniques for cleaning pallets require that each pallet be handled individually by removing them one at a time from the pallet stack, washing or spraying each pallet as it is presented, then restacking the pallets. Some or all of the handling and cleaning operations are often performed manually. This is a very time consuming and labor intensive process, since each pallet must be removed from the pallet stack of dirty pallets and a new stack must be created of clean pallets.

There is a need for an apparatus and technique for cleaning pallet stacks in a batch process such that there is simultaneous cleaning of each pallet in the stack, as opposed to removing and cleaning each pallet individually. Because major portions of the pallets' upper and lower surfaces are in direct contact with other pallets when stacked, or because the pallets are shaped so as to nest when stacked, it is not possible to adequately clean the pallet stack in a batch mode using typical washing and spraying techniques. This invention meets the stated need and addresses the problems inherent in the stacked pallets by providing an apparatus that vertically expands the pallet stack, quickly and easily separating each of the pallets in the stack a small but sufficient vertical distance from the other pallets, delivers the pallets into separate conveyor processing stations with the vertical alignment of the pallet stack maintained, washes, rinses and dries the individual pallets while the pallets are in the expanded state and traveling down the conveyor, then retrieves and restacks the cleaned pallets.

SUMMARY OF THE INVENTION

In general, the invention comprises a pallet washing apparatus and its associated methodology, wherein all of the pallets in a vertical stack of pallets are cleaned simultaneously, the stack being vertically expanded to provide a separation distance between each pallet such that cleaning spray may be directed against all surfaces of each pallet, all of the pallets then being restacked for removal in a single stack. The invention comprises means for vertically expanding a stack of pallets and transferring the pallets to a processing station comprising means for simultaneously conveying each pallet of the expanded stack through the processing station while maintaining the vertical alignment of the expanded stack, the processing station further comprising means for simultaneously washing all of the pallets, means for simultaneously rinsing all of the pallets and means for simultaneously drying all of the pallets. The invention further comprises means for retrieving all of the pallets from the pallet conveying means and restacking the cleaned pallets into a vertical stack. In a preferred embodiment the invention further comprises means for initially delivering a stack of pallets to the expanding and transferring means, and after the pallets are cleaned means for removing the restacked pallets from the retrieving and restacking means.

While the invention encompasses various embodiments, in a preferred embodiment the expanding and transferring means is a station or apparatus comprising a reciprocating carriage of vertically stacked tine pairs adapted for insertion into receiving openings in the pallet stack, the tine pairs able to be separated vertically from each other in order to expand the pallet stack, wherein the carriage reciprocates between a retracted position, an expansion position and a transfer position for placing the pallets onto the pallet conveying means. The pallet conveying means in a preferred embodiment is a station or apparatus comprising a plurality of generally horizontal powered conveyors positioned in a vertical array such that each of the pallets in the expanded stack is simultaneously received onto a corresponding conveyor, then moved simultaneously through the washing means, rinsing means and drying means. The washing means and rinsing means in a preferred embodiment are stations or apparatuses, possibly combined, comprising fixed and rotating brushes and pumps for delivering liquid through conduits and spray nozzles such that the liquids are directed against all exposed surfaces of each pallet. The drying means in a preferred embodiment is a station or apparatus comprising brushes and blowers to remove liquid from the pallets. The retrieving and restacking means in a preferred embodiment is a station or apparatus comprising a reciprocating carriage of vertically stacked tine pairs adapted for insertion into spacing between the conveyors and pallets, the tine pairs able to be contracted vertically relative to each other in order to contract and restack the cleaned pallets, wherein the carriage reciprocates between a retrieval position, a contraction position and a retracted position. In a preferred embodiment of the invention, the pallet stack delivery means is a station or apparatus comprising a powered conveyor that deposits the pallet stack into the expanding and transferring means, and the restacked pallets removal means is a station or apparatus comprising a powered conveyor that removes the pallet stack from the retrieving and restacking means.

BRIEF DESCRIPTION OF THE DRAWINGS

FIG. 10 is a partial view of a rinsing system apparatus.

DETAILED DESCRIPTION OF THE INVENTION

Figure 1:
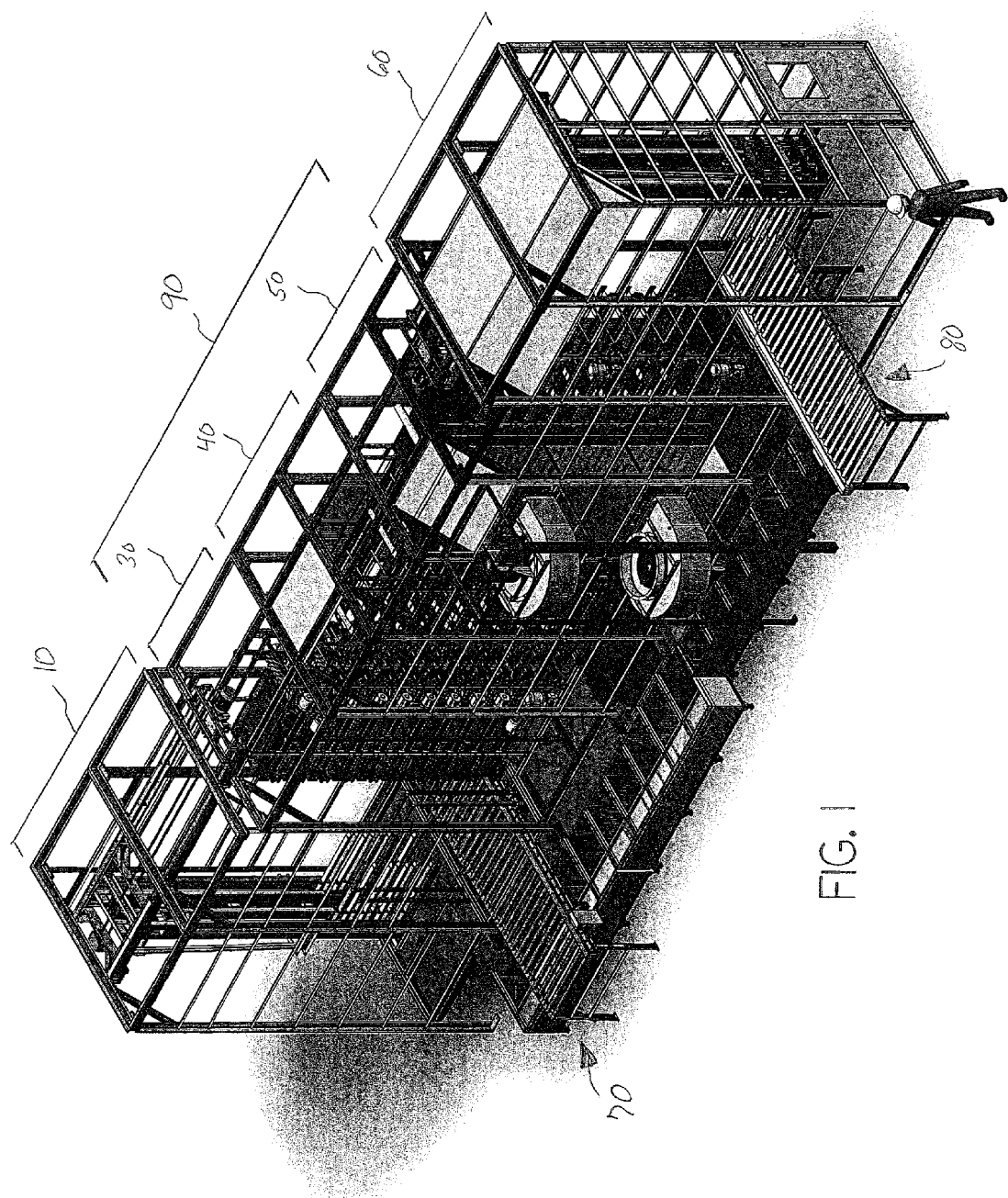
FIG. 1 is a perspective view of an embodiment of the invention illustrating various stations and zones comprising the invention.

With reference now to the drawings, the invention will be described in detail with regard for the best mode and the preferred embodiments or embodiments. In a broad and general sense, the invention comprises a pallet or crate washing apparatus and its associated methodology, wherein each of the pallets in a stack of pallets is processed simultaneously in a batch process rather than successively in an individual process. Thus, all of the pallets in a vertical stack of pallets are cleaned simultaneously, the stack being vertically expanded to provide a separation distance between each pallet such that cleaning spray may be directed against all surfaces of each pallet, all of the pallets then being restacked for removal as a single stack.

In a general sense, the invention is in various embodiments a pallet washing apparatus, said apparatus adapted to simultaneously process a plurality of individual pallets presented in a vertical pallet stack, said apparatus comprising a receiving, expanding and transferring station adapted to receive said plurality of vertically aligned pallets arranged in a pallet stack, separate each of said pallets in the vertical direction to expand said pallet stack, and deliver said pallets to a conveyor station while maintaining the vertical alignment of said pallets; said conveyor station adapted to receive said pallets from said receiving, expanding and transferring station, convey said pallets through a processing station while maintaining the vertical alignment of said pallets, and deliver said pallets to a retrieving and restacking station; said processing station comprising a washing station, a rinsing station and a drying station, said washing station adapted to simultaneous wash each said individual pallet, said rinsing station adapted to simultaneously rinse each said individual pallet, and said drying station adapted to simultaneously dry each said individual pallet; said retrieving and restacking station adapted to simultaneously retrieve each said individual pallet from said conveyor station and restack said individual pallets into a vertically oriented stack of clean pallets, and further wherein said receiving, expanding and transferring station comprises a reciprocating carriage of vertically stacked tine pairs adapted for insertion between said individual pallets, the tine pairs being separable in the vertical direction from each other tine pair in order to expand said stack of pallets, wherein said carriage reciprocates between a retracted position for receiving said pallets, an expansion position for expanding said pallets, and a transfer position for delivering said pallets to said conveyor station; wherein said conveyor station comprises a plurality of powered conveyors disposed in a vertical array, wherein each conveyor is adapted to receive and convey one of said pallets through said processing station; and wherein said retrieving and restacking station comprises a reciprocating carriage of vertically stacked tine pairs adapted for insertion between said individual pallets, the tine pairs being separable in the vertical direction from each other tine pair, wherein said carriage reciprocates between a retrieval position for receiving said pallets, a contraction position for contracting and restacking said pallets, and a retracted position wherein said tine pairs are removed from said pallets, and even further comprising a pallet stack delivering station comprising a delivery conveyor adapted to deliver said pallets to said receiving, expanding and transferring station, and a pallet stack removal station comprising a removal conveyor adapted to remove said pallets from said retrieving and restacking station.

Figure 2:
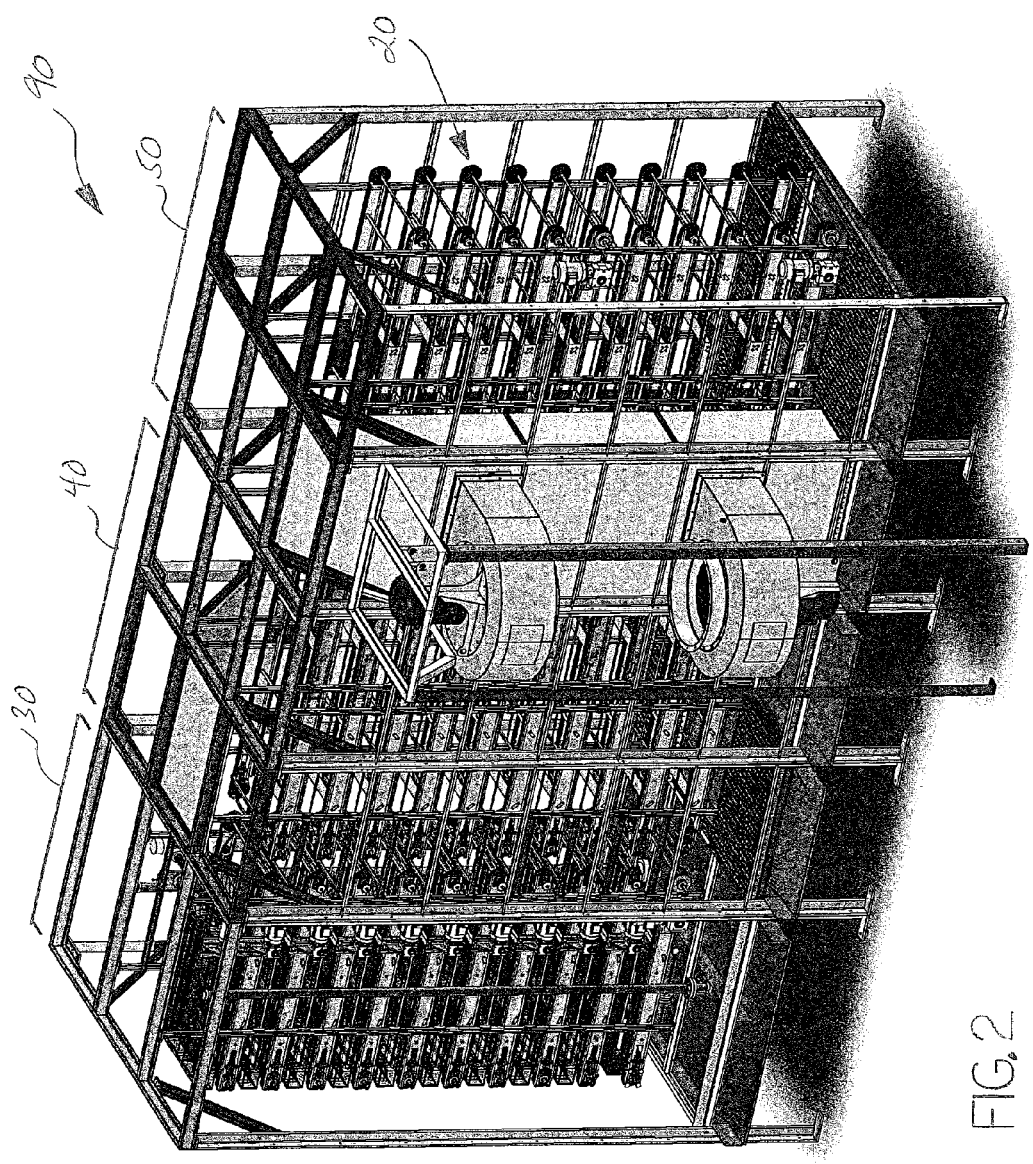
FIG. 2 is a view of the embodiment of the invention shown in FIG. 1 illustrating the processing station.

As shown in broad detail in FIGS. 1 and 2, the invention is a combination of apparatuses, stations and assemblies comprising an apparatus or station 10 for receiving and vertically expanding a stack of pallets and transferring the pallets to a processing apparatus or station 90, the processing station 90 comprising an apparatus or station 20 for conveying each pallet of the expanded stack through the processing station 90 while maintaining the vertical alignment of the expanded stack, the processing station 90 comprising particularized and dedicated processing zones comprising an apparatus or station 30 for washing all of the pallets simultaneously, an apparatus or station 40 for rinsing all of the pallets simultaneously, which may be combined, and an apparatus or station 50 for drying all of the pallets simultaneously. The invention further comprises an apparatus or station 60 for retrieving all of the pallets from the pallet conveying station 20 and restacking the cleaned pallets into a vertical stack. In a preferred embodiment the invention further comprises an apparatus or station 70 for initially delivering a stack of pallets to the expanding and transferring station 10, and an apparatus or station 80 for removing the restacked pallets from the retrieving and restacking station 60. The term "station" as used herein shall be taken to encompass a zone of operation for performance of a dedicated function, the zone comprising the apparatus, assembly or equipment necessary for performance of the operation.

An embodiment for the station 10 for receiving and vertically expanding a stack of pallets 100 and transferring the pallets 100 to a processing station 90 and the initial portion of the station 20 for conveying each pallet 100 of the expanded stack through the processing station 90 while maintaining the vertical alignment of the expanded stack is shown in FIGS. 3 through 6. The receiving, expanding and transferring station 10 is shown as comprising a reciprocating carriage 11 of vertically stacked tine pairs 12 adapted for insertion into the typical receiving openings in a pallet stack, the tine pairs 12 able to be separated in the vertical direction from each other in order to expand the pallet stack, wherein the carriage 11 reciprocates between a retracted position, an expansion position and a transfer position for placing the pallets 100 onto the pallet conveying station 20.

Figure 3:
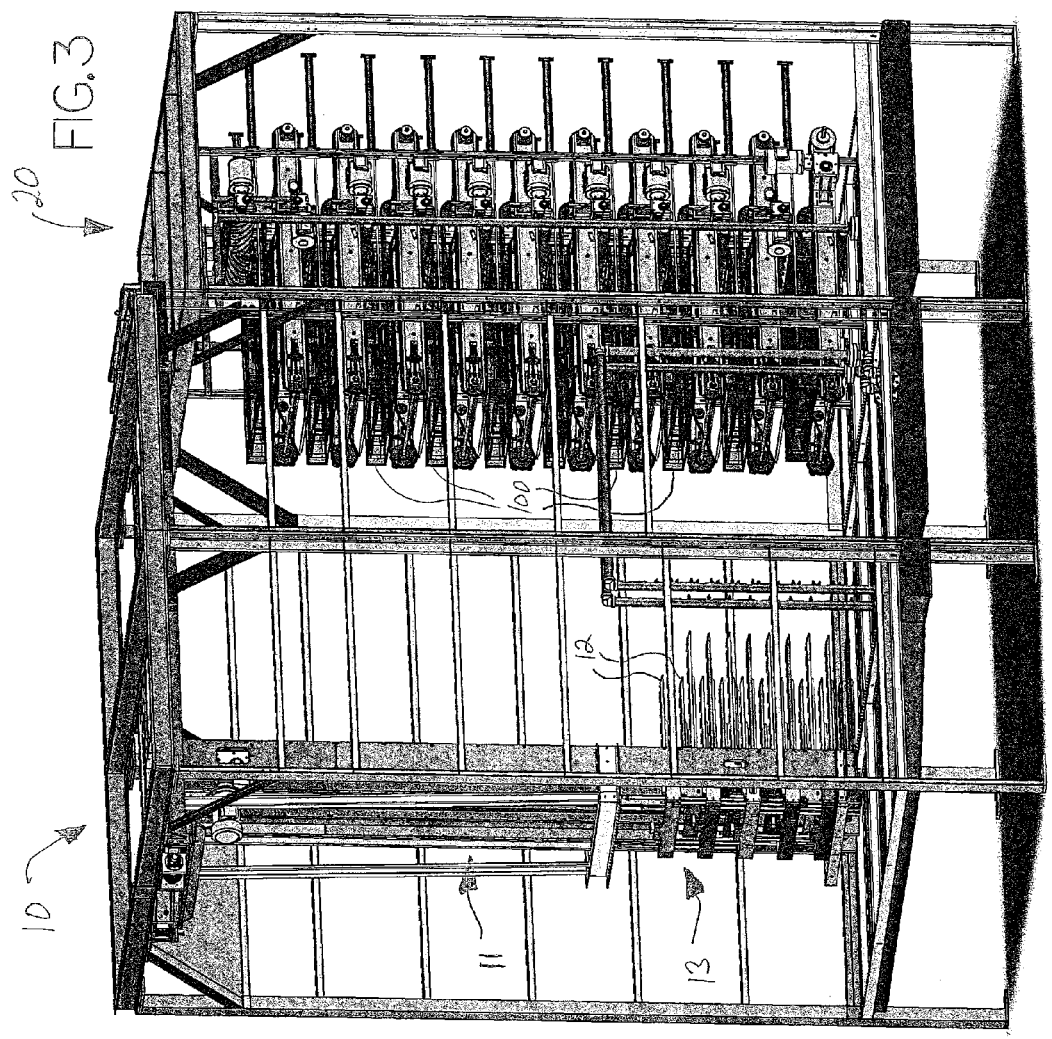
FIG. 3 is a view of the expanding and transferring station and a portion of the pallet conveying station.
Figure 4:
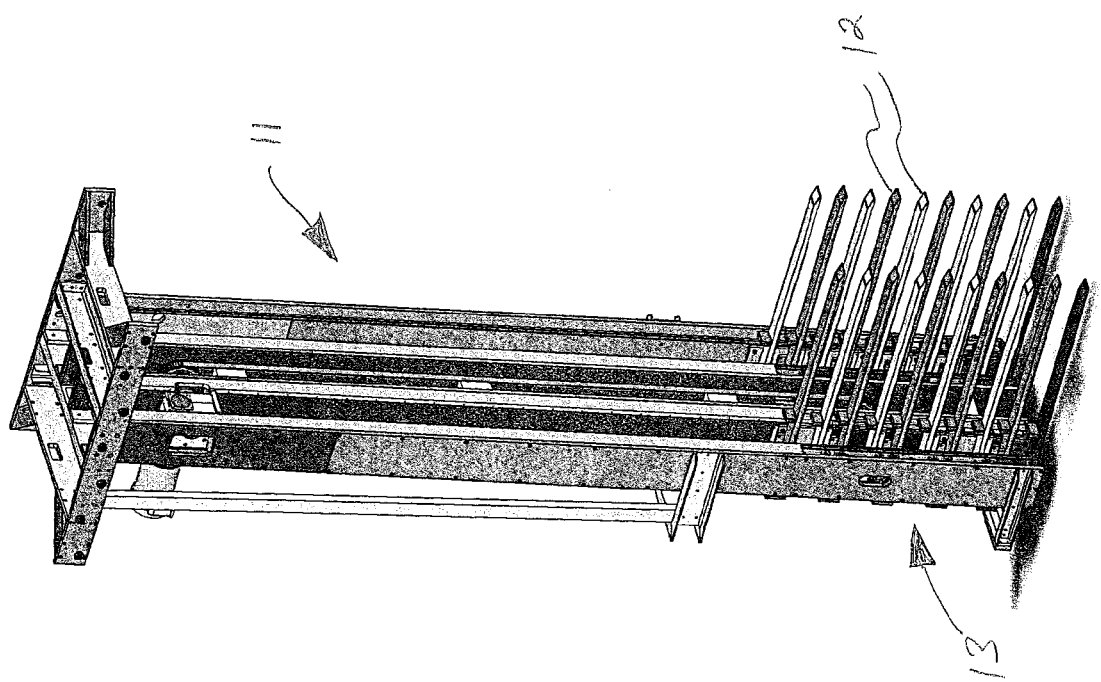
FIG. 4 is a view of a portion of the expanding and transferring station illustrating the reciprocating carriage, tine pairs and expansion assembly.
Figure 5:
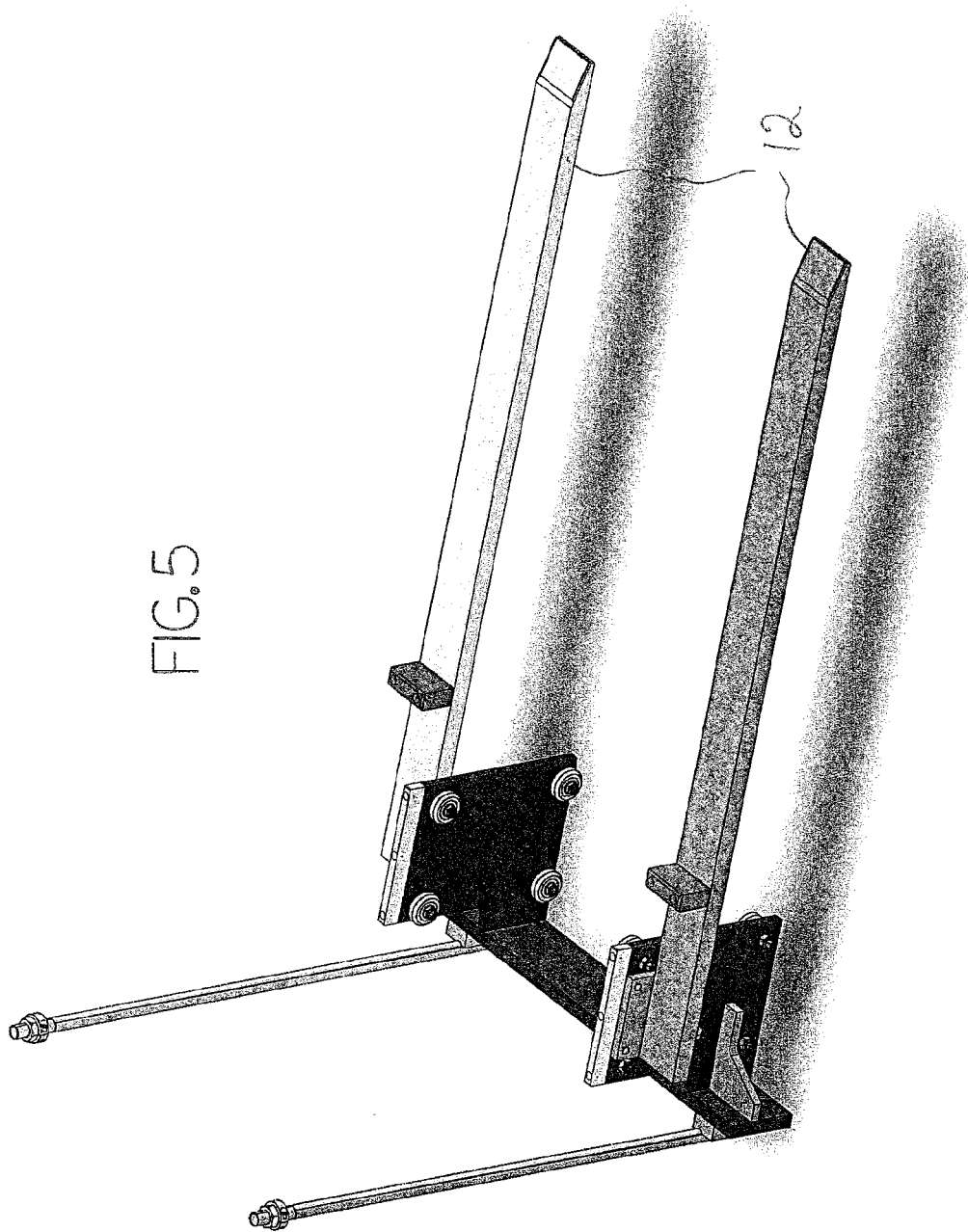
FIG. 5 is a view of one of the tine pairs.
Figure 6:
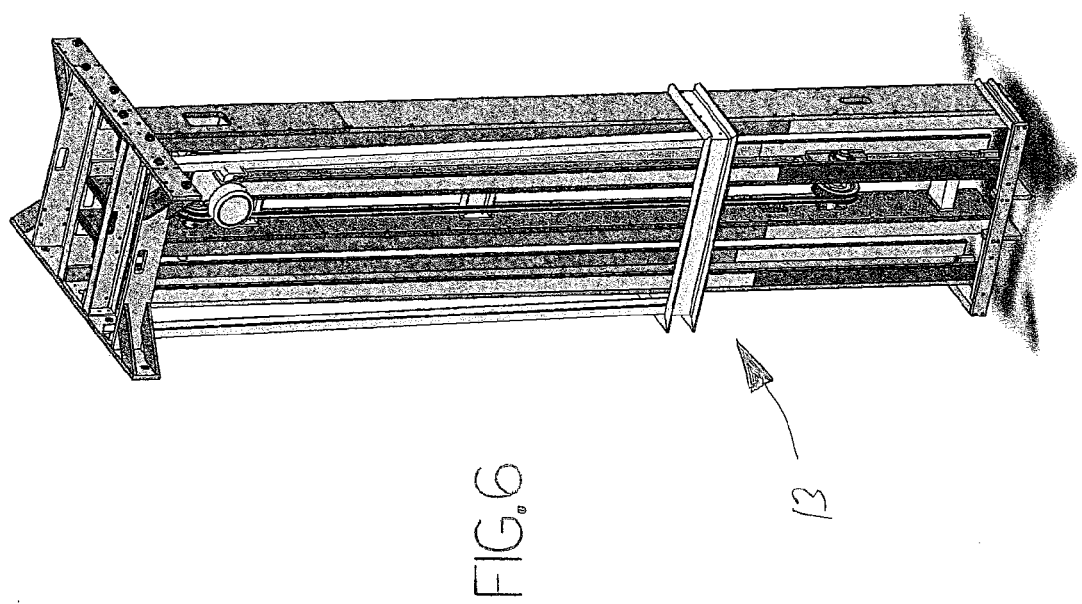
FIG. 6 is a view of the expansion apparatus.

With a stack of pallets 100 loaded into the receiving, expanding and transferring means 10 directly between the tine pairs 12 and the pallet conveying station 20, the reciprocating carriage 11 is advanced from the retracted position to the expansion position, the tine pairs 12 now being inserted into the spacing apertures of the pallet stack and thereby occupying positions between each pallet 100 in the stack, as well as below the bottom pallet 100. The tine pairs 12 are mounted on a powered expansion assembly 13 that allows each tine pair 12 to be vertically separated after insertion into the pallet stack. The pallet stack is then expanded, and the reciprocating carriage 11 is then advanced into the transfer position. In the transfer position the separated tines 12 are advanced forward to place the pallets 100 onto the individual conveyors 21 and then the tines 12 are retracted. In FIG. 3, the pallets 100 are shown as having been separated and transferred from a stack onto the pallet conveying station 20, the reciprocating carriage 11 being shown in the retracted position such that another stack of pallets 100 may be brought laterally into the expanding and transferring station 10.

Figure 7:
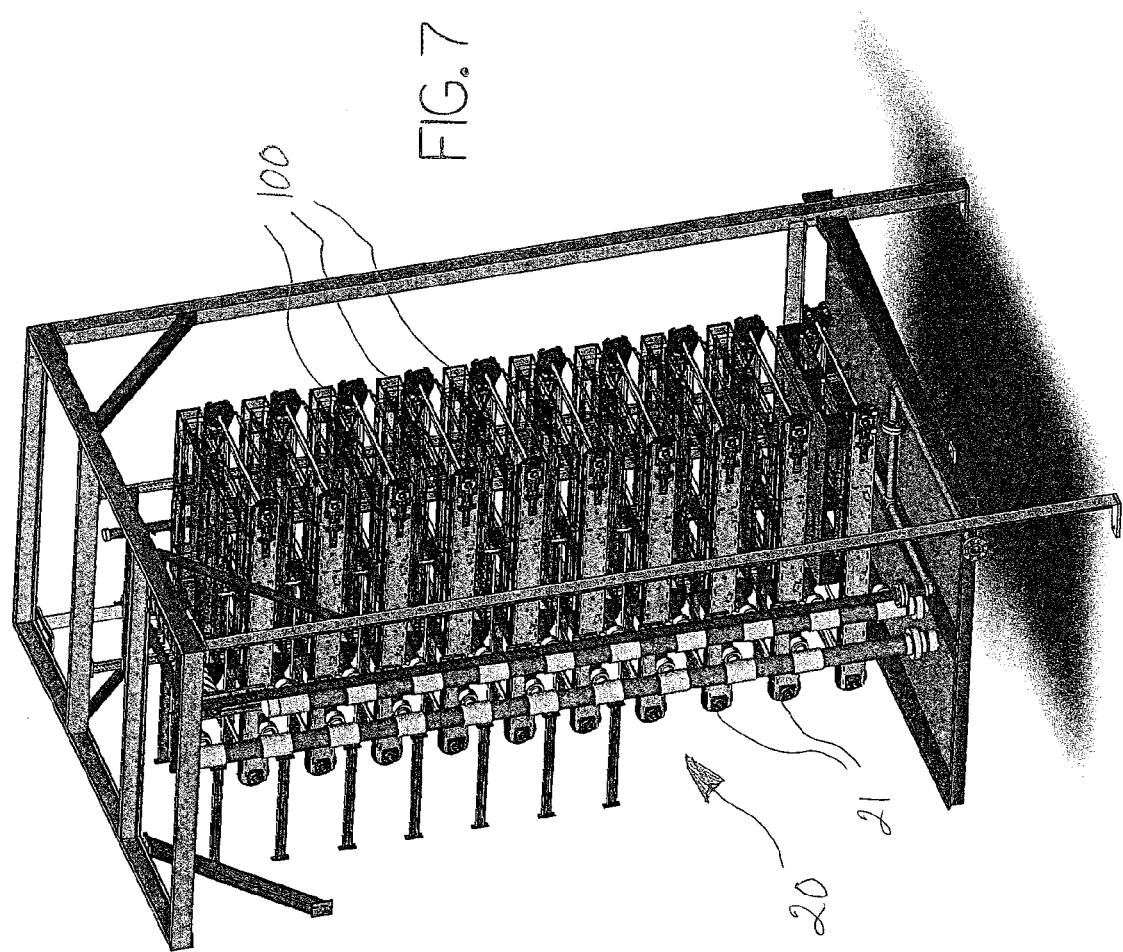
FIG. 7 is a view of a portion of the pallet conveying apparatus.
Figure 8:
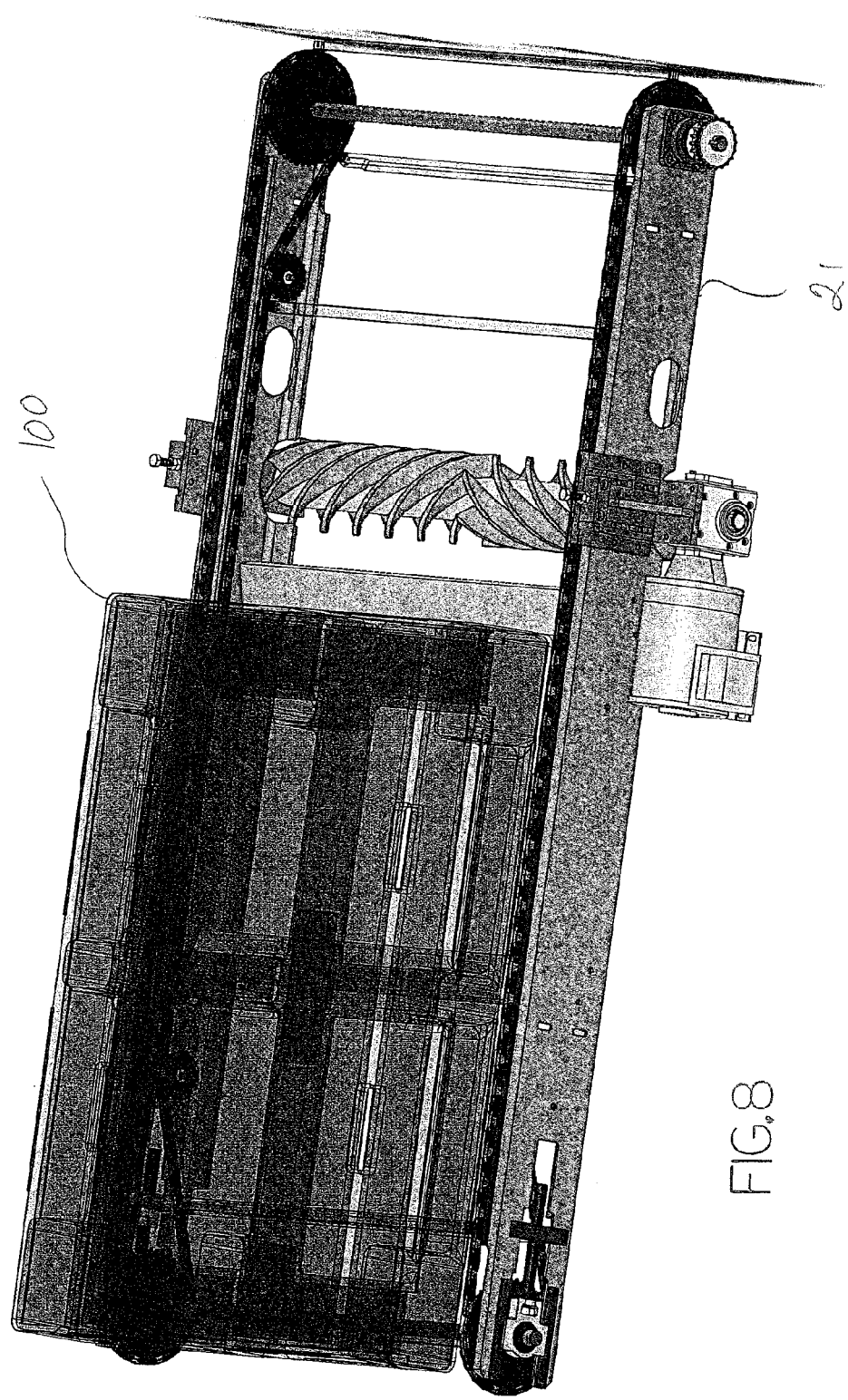
FIG. 8 is a view of one of the conveyors.

The pallet conveying station 20 in the embodiment shown in FIGS. 3, 7 and 8 comprises a plurality of individual, generally horizontal, powered conveyors 21 positioned in a vertical array such that each of the pallets 100 in the expanded stack is simultaneously received onto a corresponding conveyor 21, then moved simultaneously through the washing station 30, rinsing station 40 and drying station 50. The pallet conveying station 20 preferably comprises a plurality of conveyors 21 at each level, the conveyors 21 being aligned such that a pallet 100 is passed from the end of one conveyor 21 to the start of the next conveyor 21. Alternatively, a single conveyor 21 may be utilized at each level of the pallet conveying stations 20. The conveyors 21 may be tilted slightly along or transversely to the direction of travel, with catch basins and water diverters provided underneath each conveyor 21 to promote more rapid drainage of the pallets 100 in the washing station 30, rinsing station 40 and drying station 50. With the reciprocating carriage 11 fully advanced to the transfer position, each of the pallets 100 in the expanded pallet stack 100 is lowered onto the forward or receiving ends of the conveyors 21 and the carriage 11 is retracted such that the tine pairs 12 are withdrawn from the pallets 100. The conveyors 21 then advance the pallets 100 through the washing, rinsing and drying stations 30, 40 and 50 of the processing station 90, the vertical alignment or relative orientation of the pallets 100 from each stack being maintained as they are advanced during the cleaning process.

Figure 9:
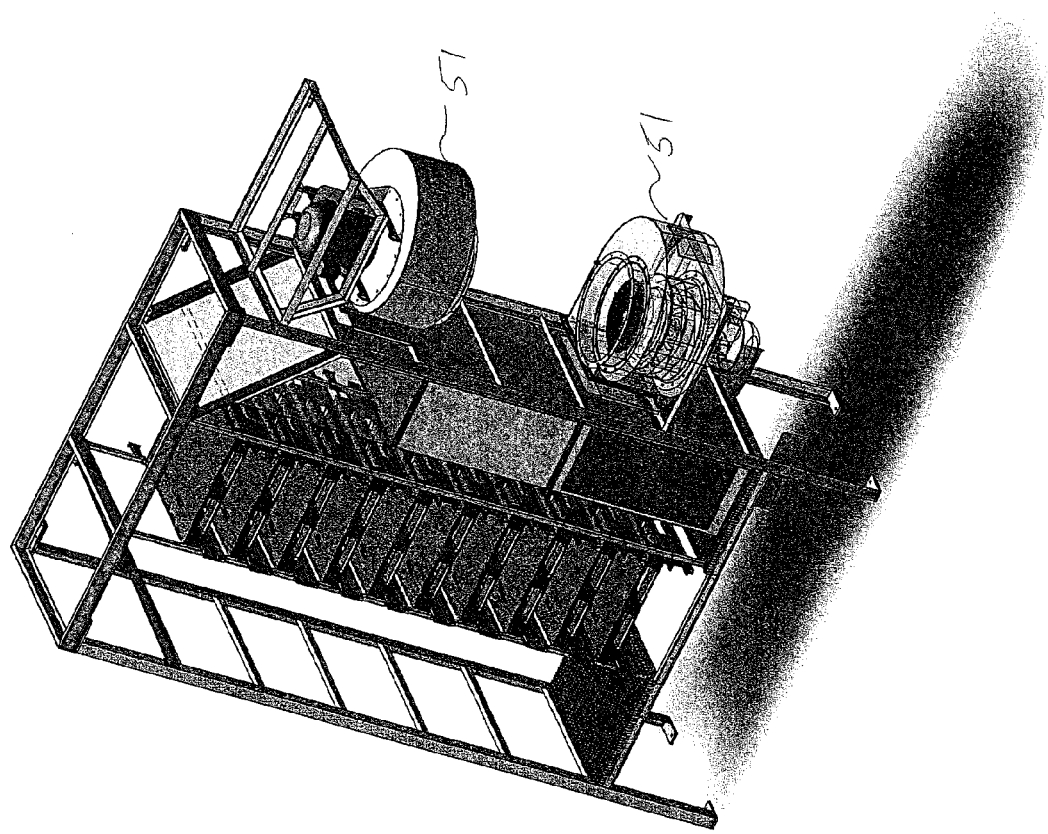
FIG. 9 is a view of a drying system apparatus.

The processing station 90 comprises three main processing or treatment zones. The first zone provides the station 30 for simultaneously washing all of the vertically aligned pallets 100 and the second zone provides the station 40 for simultaneously rinsing all of the vertically aligned pallets 100. The washing station 30 and rinsing station 30 each comprise pumps for delivering liquid through conduits and spray nozzles, such that the liquids are directed against all exposed surfaces of each pallet 100. Drainage chutes are provided to capture the liquid and debris falling from the pallets 100 during the washing and rinsing process. Preferably this liquid is filtered and treated as required to allow for the recycling of the liquid through the processing station 90 for cleaning subsequent pallets 100. The washing station 30 and the rinsing station 40 each drain into separate storage tanks. The third zone provides the station 50 for simultaneously drying all of the vertically aligned pallets 100. As shown in FIG. 9, the drying station 50 comprises one or more air blowers 51 to forcefully remove any residual liquids that have not dripped from the pallets 100. Two blowers feed air through plenums into the machine with individual nozzles spraying onto and underneath the sides and the tops of each pallet 100 at each conveyor station. In addition to fixed nozzles, air socks and vibrating air lines may be used to force pressurized air onto the pallets.

After the pallets 100 pass through the drying station 50, the conveyor station 20 presents the vertically separated pallets 100 to the retrieving and restacking station 60. The retrieving and restacking station 60 is an apparatus similar to that of the expanding and transferring station 20, in that the retrieving and restacking station 60 comprises a reciprocating carriage 61 having a vertical array of vertically separable tine pairs 62 mounted on an expansion assembly 63. The reciprocating carriage 61 moves between a retrieval position for retrieving the cleaned and dried pallets 100 from the conveyor station 20, a contraction position wherein the separated pallets 100 are reoriented into a pallet stack, and a retracted position wherein the tine pairs 62 are removed from the pallet stack so that the pallet stack may be removed. In the retrieval position the carriage 61 is advanced with the tine pairs 62 in the vertically separated status, such that the tine pairs 62 are positioned between conveyors 21. In this manner the conveyors 21 feed the pallets 100 onto the tines 62. The carriage 61 is then retracted into the contraction position to clear the pallets 100 from the conveyor station 20. The tines 62 are then lowered and the carriage 61 is brought into the retracted position, such that the pallets 100 are now stacked or nested into a pallet stack.

In a basic embodiment, the pallet stacks are delivered into the expanding and transferring station 10 and taken from the retrieving and restacking station 60 by forklift trucks or similar means. It is more preferred that a station 70 for delivering pallet stacks to the expanding and transferring station 10 and station 80 for removing pallet stacks from the retrieving and restacking station 60 be provided. The pallet stack delivering station 70 and pallet stack removing station 80 preferably each comprise gravity-fed or powered delivery and removal conveyors, as shown in FIG. 1, such that multiple stacks of pallets 100 can be loaded onto the pallet stack delivery station 70 by forklift trucks. In this manner, upon transfer of the pallets 100 of one pallet stack onto conveyor station 20 by the receiving, expanding and transfer station 10, the next pallet stack can be moved into position within the expanding and transfer station 10 as soon as the reciprocating carriage 11 occupies the retracted position. Likewise, providing a conveyor to receive successive pallet stacks from the retrieving and restacking station 60 allows for a more efficient operation since there is no need to maneuver a forklift truck to successively retrieve each pallet stack after processing.

Preferably operational zones are enclosed within an external housing to retain and control the water vapor and mist produced during the cleaning operation, with the housing comprising doors or gates for introduction and removal of the pallet stacks. Detection devices will be utilized to monitor progress of pallet stacks through the operational zones to provide optimal cleaning efficiency.

It is understood that equivalents and substitutions for certain elements set forth above may be obvious to those of ordinary skill in the art, and therefore the true scope and definition of the invention is to be as set forth in the following claims.

We claim:

1. A pallet washing apparatus comprising:
a receiving, expanding and transferring station adapted to receive a vertically aligned stack of pallets comprising individual pallets, expand said stack of pallets in the vertical direction to separate each said individual pallet to form a vertically aligned expanded pallet stack, and transfer said individual pallets to a conveyor station while maintaining the vertical alignment of said expanded pallet stack;
said conveyor station adapted to receive said expanded pallet stack, convey said expanded pallet stack through a processing station while maintaining the vertical alignment of said expanded pallet stack, and deliver said expanded stack pallet stack to a retrieving and restacking station;
said processing station comprising a washing station, a rinsing station and a drying station, said washing station adapted to simultaneous wash each said individual pallet of said expanded pallet stack, said rinsing station adapted to simultaneously rinse each said individual pallet of said expanded pallet stack, and said drying station adapted to simultaneously dry each said individual pallet of said expanded pallet stack;
said retrieving and restacking station adapted to simultaneously retrieve each said individual pallet from said conveyor station and restack said individual pallets into a vertically oriented stack of clean pallets.

2. The apparatus of claim 1, wherein said receiving, expanding and transferring station comprises a reciprocating carriage of vertically stacked tine pairs adapted for insertion between said individual pallets, the tine pairs being separable in the vertical direction from each other tine pair in order to expand said stack of pallets, wherein said carriage reciprocates between a retracted position for receiving said stack of pallets, an expansion position for expanding said stack of pallets, and a transfer position for delivering said expanded pallet stack to said conveyor station.

3. The apparatus of claim 2, said receiving, expanding and transferring station further comprising a powered expansion assembly adapted to expand and contract each said tine pair in the vertical direction.

4. The apparatus of claim 1, wherein said conveyor station comprises a plurality of powered conveyors disposed in a vertical array, wherein each conveyor is adapted to receive and convey one of said individual pallet of said expanded pallet stack through said processing station.

5. The apparatus of claim 2, wherein said conveyor station comprises a plurality of powered conveyors disposed in a vertical array, wherein each conveyor is adapted to receive and convey one of said individual pallet of said expanded pallet stack through said processing station.

6. The apparatus of claim 3, wherein said conveyor station comprises a plurality of powered conveyors disposed in a vertical array, wherein each conveyor is adapted to receive and convey one of said individual pallet of said expanded pallet stack through said processing station.

7. The apparatus of claim 1, wherein said retrieving and restacking station comprises a reciprocating carriage of vertically stacked tine pairs adapted for insertion between said individual pallets, the tine pairs being separable in the vertical direction from each other in order to contract the pallet stack, wherein said carriage reciprocates between a retrieval position for receiving said individual pallets of said expanded pallet stack, a contraction position for contracting and restacking said expanded pallet stack into said clean pallet stack, and a retracted position wherein said tine pairs are removed from said clean pallet stack.

8. The apparatus of claim 2, wherein said retrieving and restacking station comprises a reciprocating carriage of vertically stacked tine pairs adapted for insertion between said individual pallets, the tine pairs being separable in the vertical direction from each other in order to contract the pallet stack, wherein said carriage reciprocates between a retrieval position for receiving said individual pallets of said expanded pallet stack, a contraction position for contracting and restacking said expanded pallet stack into said clean pallet stack, and a retracted position wherein said tine pairs are removed from said clean pallet stack.

9. The apparatus of claim 4, wherein said retrieving and restacking station comprises a reciprocating carriage of vertically stacked tine pairs adapted for insertion between said individual pallets, the tine pairs being separable in the vertical direction from each other in order to contract the pallet stack, wherein said carriage reciprocates between a retrieval position for receiving said individual pallets of said expanded pallet stack, a contraction position for contracting and restacking said expanded pallet stack into said clean pallet stack, and a retracted position wherein said tine pairs are removed from said clean pallet stack.

10. The apparatus of claim 5, wherein said retrieving and restacking station comprises a reciprocating carriage of vertically stacked tine pairs adapted for insertion between said individual pallets, the tine pairs being separable in the vertical direction from each other in order to contract the pallet stack, wherein said carriage reciprocates between a retrieval position for receiving said individual pallets of said expanded pallet stack, a contraction position for contracting and restacking said expanded pallet stack into said clean pallet stack, and a retracted position wherein said tine pairs are removed from said clean pallet stack.

11. The apparatus of claim 1, further comprising a pallet stack delivering station comprising a delivery conveyor adapted to deliver said stack of pallets to said receiving, expanding and transferring station.

12. The apparatus of claim 1, further comprising a pallet stack removal station comprising a removal conveyor adapted to remove said stack of pallets from said retrieving and restacking station.

13. The apparatus of claim 11, further comprising a pallet stack removal station comprising a removal conveyor adapted to remove said stack of pallets from said retrieving and restacking station.

14. The apparatus of claim 2, further comprising a pallet stack delivering station comprising a delivery conveyor adapted to deliver said stack of pallets to said receiving, expanding and transferring station, and a pallet stack removal station comprising a removal conveyor adapted to remove said stack of pallets from said retrieving and restacking station.

15. The apparatus of claim 4, further comprising a pallet stack delivering station comprising a delivery conveyor adapted to deliver said stack of pallets to said receiving, expanding and transferring station, and a pallet stack removal station comprising a removal conveyor adapted to remove said stack of pallets from said retrieving and restacking station.

16. The apparatus of claim 5, further comprising a pallet stack delivering station comprising a delivery conveyor adapted to deliver said stack of pallets to said receiving, expanding and transferring station, and a pallet stack removal station comprising a removal conveyor adapted to remove said stack of pallets from said retrieving and restacking station.

17. The apparatus of claim 7, further comprising a pallet stack delivering station comprising a delivery conveyor adapted to deliver said stack of pallets to said receiving, expanding and transferring station, and a pallet stack removal station comprising a removal conveyor adapted to remove said stack of pallets from said retrieving and restacking station.

18. A pallet washing apparatus, said apparatus adapted to simultaneously process a plurality of individual pallets presented in a vertical pallet stack, said apparatus comprising:
a receiving, expanding and transferring station adapted to receive said plurality of vertically aligned pallets arranged in a pallet stack, separate each of said pallets in the vertical direction to expand said pallet stack, and deliver said pallets to a conveyor station while maintaining the vertical alignment of said pallets;
said conveyor station adapted to receive said pallets from said receiving, expanding and transferring station, convey said pallets through a processing station while maintaining the vertical alignment of said pallets, and deliver said pallets to a retrieving and restacking station;
said processing station comprising a washing station, a rinsing station and a drying station, said washing station adapted to simultaneous wash each said individual pallet, said rinsing station adapted to simultaneously rinse each said individual pallet, and said drying station adapted to simultaneously dry each said individual pallet;
said retrieving and restacking station adapted to simultaneously retrieve each said individual pallet from said conveyor station and restack said individual pallets into a vertically oriented stack of clean pallets.

19. The apparatus of claim 18, wherein said receiving, expanding and transferring station comprises a reciprocating carriage of vertically stacked tine pairs adapted for insertion between said individual pallets, the tine pairs being separable in the vertical direction from each other tine pair in order to expand said stack of pallets, wherein said carriage reciprocates between a retracted position for receiving said pallets, an expansion position for expanding said pallets, and a transfer position for delivering said pallets to said conveyor station;

wherein said conveyor station comprises a plurality of powered conveyors disposed in a vertical array, wherein each conveyor is adapted to receive and convey one of said pallets through said processing station; and wherein said retrieving and restacking station comprises a reciprocating carriage of vertically stacked tine pairs adapted for insertion between said individual pallets, the tine pairs being separable in the vertical direction from each other tine pair, wherein said carriage reciprocates between a retrieval position for receiving said pallets, a contraction position for contracting and restacking said pallets, and a retracted position wherein said tine pairs are removed from said pallets.

20. The apparatus of claim 19, further comprising a pallet stack delivering station comprising a delivery conveyor adapted to deliver said pallets to said receiving, expanding and transferring station, and a pallet stack removal station comprising a removal conveyor adapted to remove said pallets from said retrieving and restacking station.

* * * * *